Sept. 11, 1956     J. A. VARNEY     2,762,132
SIGNALLING DRIFT INDICATOR
Filed Dec. 15, 1952     2 Sheets—Sheet 1
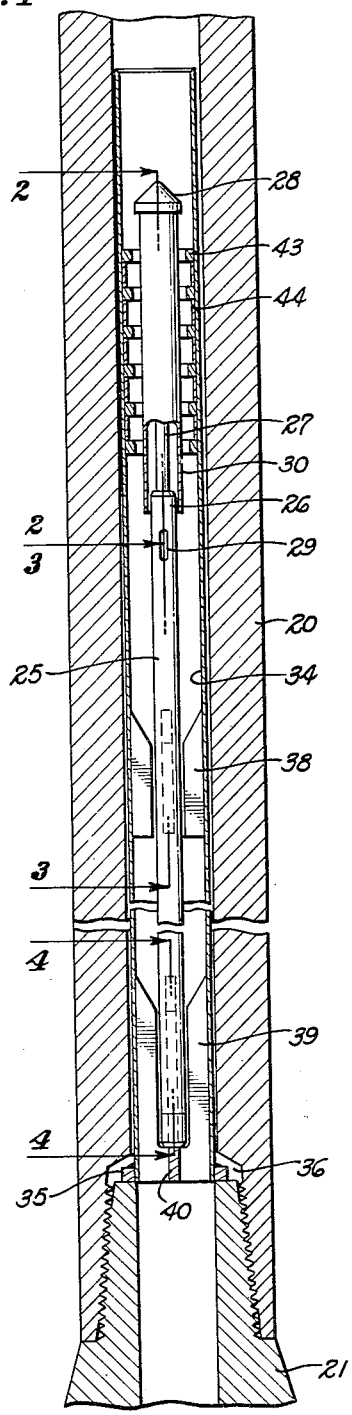
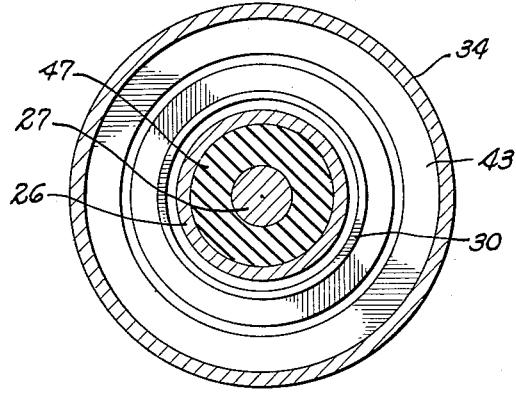
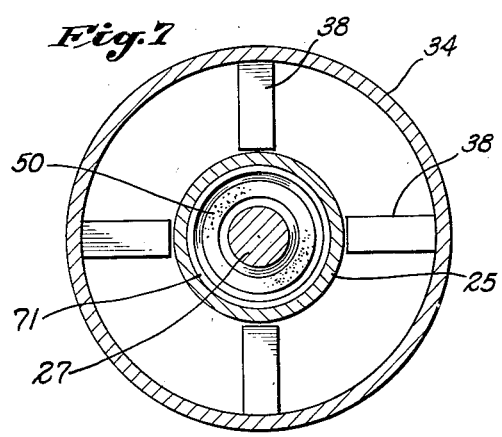
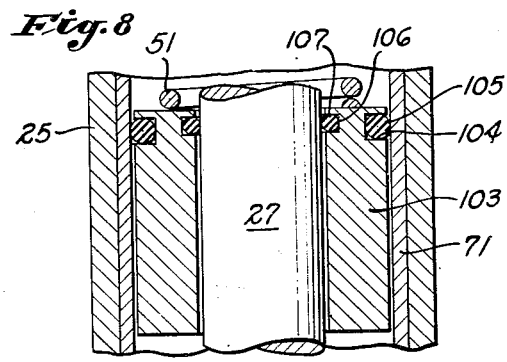
INVENTOR:
JUSTIN ARNOLD VARNEY
BY HIS ATTORNEYS
HARRIS, KIECH, FOSTER & HARRIS Sept. 11, 1956  J. A. VARNEY  2,762,132
SIGNALLING DRIFT INDICATOR
Filed Dec. 15, 1952  2 Sheets-Sheet 2
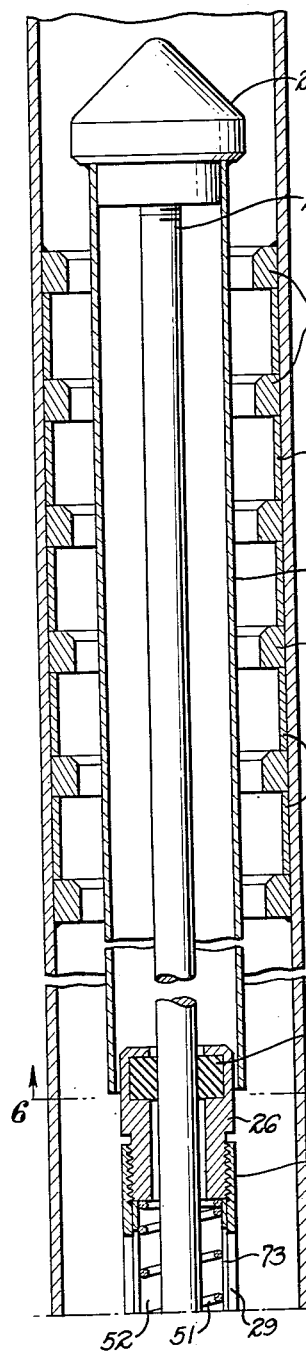
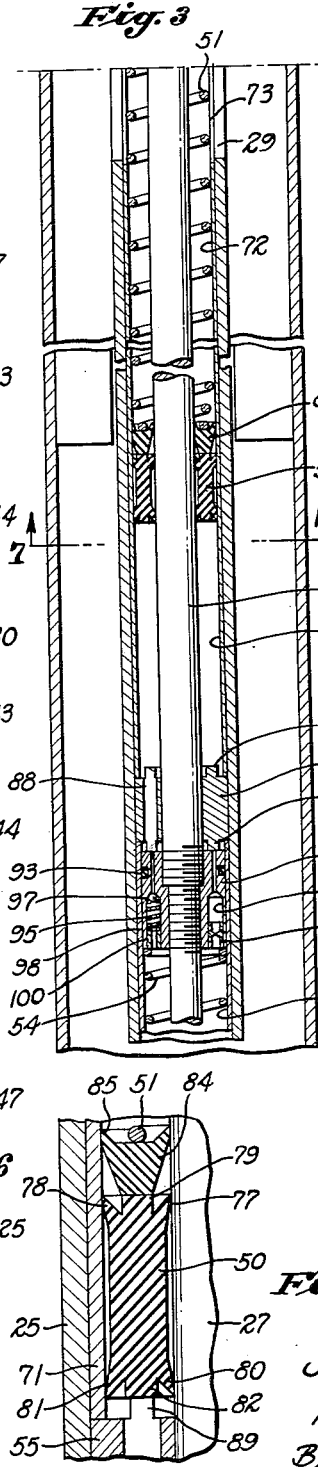
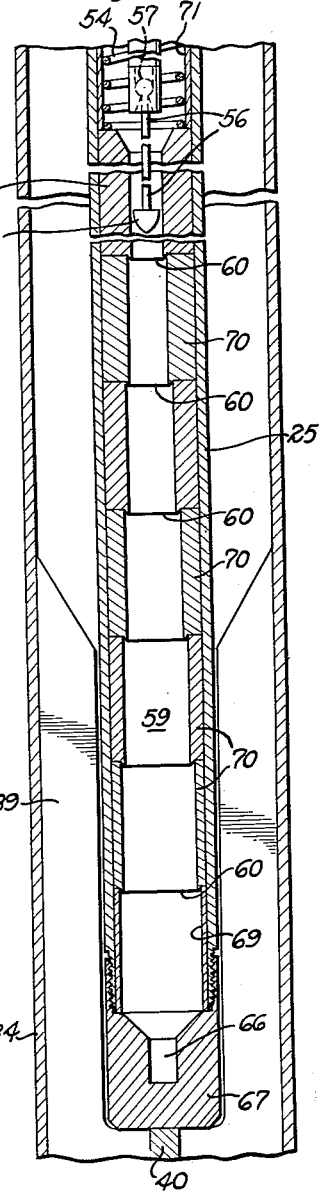
INVENTOR:
JUSTIN ARNOLD VARNEY
BY HIS ATTORNEYS
HARRIS, KIECH, FOSTER & HARRIS

United States Patent Office 2,762,132
Patented Sept. 11, 1956

2,762,132

SIGNALLING DRIFT INDICATOR

Justin Arnold Varney, Los Angeles, Calif.

Application December 15, 1952, Serial No. 326,111

11 Claims. (Cl. 33—205)

My invention relates to devices for ascertaining and indicating deviations from vertical of a well bore, being applicable to well surveying devices in general, and is directed to an embodiment of such a device for use in a string of drill pipe to serve as a deviation warning means for the convenience of a driller. The present invention is an improvement on the signalling clinographs set forth in our Patents 2,329,732, issued September 21, 1943, and 2,435,934, issued February 10, 1948, which prior disclosures are hereby made a part of the present disclosure by reference.

The basic combination of such a device includes a cylindrical housing or instrument case for positioning in a well bore coaxially thereof, a reciprocative plunger extending from the end of the housing, suitable yielding means to move the plunger in one direction so that the plunger may be retracted in the opposite direction by the stream of drilling fluid, gravity-responsive means to limit the range of movement of the plunger in accord with the deviation of the device from vertical and, finally, means to generate a signal in accord with the range of movement of the plunger thereby to indicate the position of the device relative to vertical. As the plunger moves in response to force created by the stream of drilling fluid, it periodically chokes the stream to produce pressure variations that may be detected at the surface of the well. The pressure variations may be shock waves characteristic of water hammer or may be more sustained pressure changes. In any event, if the signals are not audible or otherwise directly sensible at the surface of the well, they may be readily detected by suitable pressure-responsive means.

During normal operation, the plunger is held at one of its two limit positions by pressure from the stream of drilling fluid. To operate the device, the driller stops circulation of the drilling fluid to permit the yielding means in the device to shift the plunger away from its normal limit position and the plunger stops at a position determined by the gravity-responsive means in the device. The gravity-responsive means is in the form of a pendulum that traverses a series of fixed shoulders representing different degrees of deviation from vertical, the pendulum operating in a body of instrument fluid such as oil and being adapted to stop the plunger movement by engaging the appropriate fixed shoulder. The driller waits until the pendulum engages a fixed shoulder to stop the plunger movement and then restarts circulation of the drilling fluid to cause the plunger to retract and thereby generate the informative signal consisting of one or more pressure changes in the stream or drilling fluid.

One object of the invention is to provide an improved form of movable wall to separate the drilling fluid from the body of oil or like fluid in which the pendulum is immersed. Heretofore the movable wall has been flexible sheet material in the form of a bellows-like sleeve with one end of the sleeve embracing the plunger and the other end embracing the instrument case around the plunger. In such a construction, the flexible diaphragm is exposed throughout its length to the abrasive action of the drilling fluid and, moreover, is repeatedly folded and unfolded as it follows the reciprocations of the plunger.

The present invention substitutes a durable floating ring member or annular piston for the sheet diaphragm, the floating piston slidingly embracing the plunger in sliding contact with the surrounding instrument wall. The floating piston moves opposite to the direction of plunger movement and preferably is accompanied by an auxiliary cleaning ring which acts as a scraper to dislodge particles from the plunger and instrument case. A feature of the preferred form of the invention is the provision of an auxiliary spring to exert continuous pressure on the floating piston to prevent the formation of any voids in the instrument fluid, especially when the instrument is outside the well and subject to only atmospheric pressure.

One important object of the invention is to reduce if not eliminate an undesirable tendency for the plunger to vibrate or flutter in the course of its fluid-actuated return movement. This tendency may be understood when it is considered that the plunger, being supported at one end, is free to vibrate and at its free end is exposed to the impact of the high pressure stream of drilling fluid. The tendency for the plunger to vibrate is aggravated by the periodic chocking operation which is carried out at the free end of the plunger.

Another important object of the invention is to minimize the abrasive effect of the drilling fluid on the plunger. If suitable protection is not provided, the extended plunger is exposed for abrasive impact by the high velocity fluid and, moreover, the necessary guide embracing the plunger at the end of the instrument case is a direct target for the stream. Abrasive particles carried by the stream at velocities increased by the choking action move in a direction to strike the guide means head on and tend, in the absence of protective means, to wedge between the guide means and the plunger.

These two objects of minimizing vibration and reducing abrasive wear are attained by providing a skirt that is carried by the plunger head and is dimensioned to telescope over the cylindrical housing or instrument case. The skirt minimizes vibration substantially by changing the channel for the fluid stream to a configuration conductive to smoother flow. More important, however, the skirt reduces vibration by an inherent damping effect. In addition, the skirt minimizes abrasive action by protecting the plunger as well as the plunger guide from high velocity impact by the particle-laden stream of drilling fluid. In the preferred embodiment of the invention, the skirt also cooperates with the instrument case to prevent abrasive particles larger than a given size from entering the region of the extended plunger. A further feature of the arrangement is that the skirt may provide a useful dashpot action if desired.

It is a further object of the invention to provide a device of the present character that does not require a special drill collar or sub and that may be readily inserted in a conventional drill string. This object is obtained by providing as part of the device a special liner with a peripheral flange, which liner may be inserted into a drill string with the liner flange engaging the drill string at one of its joints. The liner is provided with choke rings for cooperation with the plunger and is adapted to hold the instrument case in proper position and alignment for cooperation with the choke rings. A feature of this embodiment of the invention is that the special liner may be so constructed that it releasably retains the instrument case, the instrument case being simply lowered into operative position inside the liner.

The above and other objects and advantages of the invention will be apparent in the following detailed description in conjunction with the accompanying drawings.

In the drawings, which are to be regarded as merely illustrative:

Fig. 1 is an axial section through a drill string and a special liner in the drill string to show how the instrument case with its retractable plunger is mounted in the drill string;

Figs. 2, 3 and 4 are enlarged axial sections taken as indicated by the lines 2—2, 3—3 and 4—4 of Fig. 1;

Fig. 5 is an enlarged detail of Fig. 3 showing the construction of the floating piston and the associated scraper member;

Fig. 6 is a transverse section on a larger scale taken as indicated by the line 6—6 of Fig. 2;

Fig. 7 is a similar transverse section taken on the line 7—7 of Fig. 3; and

Fig. 8 is a fragmentary sectional view showing a modified form of the floating piston.

Fig. 1 illustrates the presently preferred embodiment of the invention as installed in a drill string that includes a drill collar 20 and a bit 21. This embodiment includes a housing or instrument case 25 having at its upper end a guide bushing 26 through which extends the usual plunger 27 having an enlargement or head 28 on its free end. The housing 25 is provided with one or more elongated ports 29 below the guide bushing 26 for ingress of the surrounding drilling fluid when the plunger moves upward and egress of the fluid as the plunger makes its return movement.

In accord with the preferred practice of the invention, a cylindrical skirt 30 is mounted on the plunger head 28, the skirt being smaller in diameter than the head but of sufficient diameter to freely telescope over the upper end of the housing or instrument case 25. Preferably, the skirt 30 is of sufficient length to enclose the upper end of the housing 25 when the plunger 27 is fully extended as shown in Fig. 1 so that the drilling fluid can reach the periphery of the plunger above the guide bushing 26 only by passing through the narrow annular clearance space between the skirt and the housing 25. Preferably this annular clearance is just large enough to pass the larger particles in the drilling fluid. For example, the radial dimension of the annular clearance may be on the order of magnitude of 1/10 of an inch.

The preferred form of the invention includes a cylindrical shell or liner 34 suitably adapted for mounting in the drilling string without requiring specialization of the drilling string structure. In this instance, the liner 34 has a base flange 35 in the form of a welded ring that is dimensioned to extend into an annular space in a joint of the drilling string. Fig. 1 shows the base flange seated in the annular space 36 provided by the joint between the drill collar 20 and the drilling bit 21. The instrument case 25 is held upright by an upper set of four radial guides 38 extending inward from the liner 34, together with a lower set of similar radial guides 39, and rests upon a spider 40 at the lower end of the liner, the spider being integral with the lower radial guides 39.

The liner 34 is also provided with a series of internal choke rings 43 for cooperation with the plunger head 28 to periodically choke the stream of drilling fluid in the course of the movement of the plunger. As best shown in Fig. 2, the choke rings 43 may be separate ring members separated by spacer sleeves 44, the upper and lower choke rings being welded or otherwise attached to the liner 34 to hold the stack of rings and spacer sleeves in position. Preferably, the relative dimensioning of the parts is such that the annular clearance space between the plunger head 28 and the choke rings 43 has a cross-sectional area of substantially less than the cross-sectional area of the annular clearance space between the skirt 30 and the choke rings.

As shown in Fig. 2, the guide bushing 26 which is threaded into the upper end of the instrument case 25 preferably incorporates a guide ring 47 of suitable material such as an appropriate elastomer.

The principal parts of the device inside the instrument case 25 include: the floating seal in the form of an annular floating piston 50 that slidingly embraces the plunger 27 and is in sliding contact with the inner wall of the instrument case; a coil spring 51 in compression between the guide bushing 26 and the floating piston 50 to continuously urge the floating piston downward; a body of instrument fluid supporting the floating piston 50; a dashpot piston 53 carried by the plunger 27 at an intermediate point thereon; an actuating spring 54; an annular stop member 55 that is fixedly mounted inside the instrument case for cooperation with the dashpot piston to limit the upward movement of the plunger 27; and a pendulum 56 that is mounted on the lower end of the plunger by a ball joint 57 for universal movement.

The pendulum 56 moves in what may be termed a pendulum chamber 59 that is provided with a series of downwardly-directed sharp shoulders 60 which are progressively restricted in diameter from a relatively large diameter lowermost shoulder to a relatively small diameter uppermost shoulder. The pendulum 60 is formed with a head or enlargement 61 at its lower end which is hook-shaped in cross section as may be seen in Fig. 4 for the purpose of engaging the shoulders 60 selectively. Normally during drilling operation when the plunger head 28 is retracted against the guide bushing 26 the pendulum 56 extends into a recess or well 66 provided by a heavy cap 67 that closes the lower end of the instrument case 25.

A feature of the preferred construction of the invention is the use of a stack of annular members to form the fixed structure inside the instrument case 25. In the particular arrangement shown in the drawings, a spacer sleeve 69 resting on the cap 67 at the bottom of the instrument case supports a stack of cylindrical members 70 the lower ends of which form the corresponding series of sharp shoulders 60. Resting on the top of the stack of cylindrical members 70 is a cylindrical liner 71 that supports the previously mentioned annular stop member 55. The annular stop member in turn supports a cylindrical liner 72 that extends to the guide bushing 26 at the top of the instrument case and is provided with suitable apertures 73 corresponding to the ports 29 in the instrument case.

The floating piston 50 is preferably a one-piece body of rubber or other elastomer material which as best shown in Fig. 5 is formed with suitable flexible lips for pressure-responsive sealing contact with both the plunger 27 and the liner 72 of the instrument case 25. In the particular construction shown in the drawings, the floating piston 50 has an upper inner annular lip 77 for contact with the plunger 27, an upper outer annular lip 78 for contact with the liner 71, a circular end rib 79 intermediate the two lips, a lower inner lip 80 for sliding contact with the plunger 27, a lower outer lip 81 for contact with the liner 71 and a circular end rib 82 between the two lower lips. Since the two upper annular lips 77 and 78 of the floating piston 50 are exposed to the abrasive drilling fluid it is desirable to provide an auxiliary scraper means movable with the floating piston to dislodge abrasive particles from the plunger 27 and the liner 71 in advance of the two lips. For this purpose, a suitable scraper ring member 84 may rest on the floating piston 50 in abutment against the end rib 79, as best shown in Fig. 5. The scraper ring 84 may be a relatively hard elastomer body formed with two annular blade portions 85 to scrape the plunger 27 and the liner 71, respectively. In the arrangement shown in the drawings, the scraper ring is interposed between the spring 51 and the floating piston 50 to be held against the piston by the pressure of the spring.

It is contemplated that the range of movement of the floating piston 50 corresponding to maximum reciprocation of the plunger 27 will be substantially less than the distance between the fixed stop 55 and the guide bushing 26 and that normally the lower limit position of the floating piston 50 will be an appreciable distance above the stop 55 and the upper limit position will be well below the guide bushing 26. Thus, the normal minimum distance between the floating piston and the stop 55 provides a desirable allowance for both leakage of the instrument fluid and thermal contraction of the instrument fluid and, on the other hand, the normal minimum distance between the upper limit position of the floating piston and the guide bushing 26 allows for thermal expansion of the instrument fluid.

As shown in Fig. 3, the fixed stop 55 surrounds the plunger 27 and is provided with at least one longitudinal passage 88 therethrough for relatively free flow of the instrument fluid between the annular space above the stop and the annular space below. Preferably, the stop member is formed with a rib 89 on its upper end and a similar rib 90 on its lower end. The lower rib 90 serves for abutment by the dashpot piston 53 to limit the upward movement of the plunger 27. The upper rib 89 serves for abutment against the lower end rib 82 of the floating piston, as shown in Fig. 5, on the infrequent occasions when the floating piston is permitted to drop to the level of the fixed stop, for example, when the instrument is being serviced between periods of operation.

The dashpot piston 53 is suitably mounted on the plunger 27 at an intermediate point on the plunger below the fixed stop 55. As best shown in Fig. 3, the plunger 27 may be made in two sections which are interconnected by screw thread engagement with the dashpot piston. It is contemplated that the dashpot piston 53 will restrict the flow of the instrument fluid therethrough for retarding effect both on the upward movement and the downward movement of the plunger 27, but with greater retarding effect on the downward movement of the plunger. Preferably, the desired retarding action is accomplished by providing two paths of fluid flow through the dashpot piston with means to cut off flow through one of the passages in response to downward movement of the piston.

In the construction shown in Fig. 3, the dashpot piston 53 is an annular body embraced by an O-ring 93 and provided with two longitudinal passages 94 and 95. Passage 94 is restricted by a sharp-edged orifice member 96 which meters the fluid flow therethrough at a relatively low rate. The passage 95 is provided with a check valve in the form of a ball member 97 which is pressed toward its closed position by a spring 98, the spring being confined by a bushing 100. It is apparent that both of the passages 94 and 95 will be open on the upward movement of the dashpot piston but on the downward movement the passage 95 will be closed by the ball member so that the rate of flow of instrument fluid through the dashpot piston will be determined solely by the orifice member 96.

Fig. 8 shows the construction of a floating piston 103 that may be substituted for the above-described floating piston 50 and scraper member 84. The floating piston 103 is a metal body of annular configuration formed with an outer circumferential groove 104 to receive an outer O-ring 105 and formed with an inner circumferential groove 106 to seat an inner O-ring 107.

The operation of the instrument may be readily understood from the foregoing description. During drilling operation when the drilling fluid is flowing downward through the drill string, the impact of the drilling fluid against the plunger head 28 holds the plunger 27 retracted against the guide bushing 47. At this retracted position of the plunger, the pendulum 56 extends into the well 66 at the bottom of the instrument. When the downward flow of the drilling fluid is stopped for the purpose of making a bore hole deviation test, the actuating spring 54 pressing upward against the dashpot piston 53 causes the plunger to move upward at a rate governed by the retarding action of the dashpot piston 53. The ball 97 in the dashpot piston is unseated to permit the instrument fluid to flow through both of the piston passages 94 and 95. The pendulum 56 moving slowly upward through the instrument fluid in the pendulum chamber 59 hangs vertically and, if the instrument case is vertical, the pendulum will permit the plunger 27 to continue its upward movement to the maximum extent, the upward movement being stopped by abutment by the dashpot piston 53 against the fixed stop 55. If the pendulum 56 is out of alignment with the axis of the instrument case, however, by virtue of inclination of the instrument case from vertical, the pendulum head 61 will engage one of the sharp shoulders 60 in the pendulum chamber to stop the upward movement of the plunger before the dashpot piston reaches the fixed stop. The greater the deviation from vertical the shorter the upward travel of the pendulum before it is stopped by one of the shoulders 60. During this upward movement of the plunger 27, the floating piston 50 moves downward in accord with the decreasing displacement of the instrument fluid by the plunger and simultaneously the drilling fluid flows into the instrument case through the ports 29 at the same rate, the over-all displacement of the drilling fluid by the instrument remaining constant. Also, of course, the drilling fluid flows inward and upward through the annular space between the instrument case and the skirt 30 in accord with the longitudinal expansion of the annular space between the guide bushing 26 and the upwardly moving plunger head 28.

After a sufficient interval of time to permit the upward movement of the plunger 27 to be arrested at whatever position may be determined by the position of the instrument case relative to vertical, downward circulation of the drilling fluid through the drill string is resumed and the impact of the drilling fluid against the plunger head 28 causes the plunger to retract downward to its normal retracted position. The ball member 97 closes off flow through the dashpot piston passage 95 so that the downward movement of the plunger is limited to the flow capacity of the orifice restriction in passage 94. During this downward movement of the plunger 27 the floating piston 50 rises in accord with the increase in displacement of the instrument fluid by the plunger and the drilling fluid above the floating piston is expelled through the ports 29 at the same rate. At the same time, drilling fluid is expelled from the interior of the skirt 30 through the annular space between the skirt and the instrument case.

In the course of the downward movement of the plunger 27 caused by impact of the drilling fluid against the plunger head 28, the plunger head repeatedly chokes down the stream of drilling fluid as the plunger head passes through the successive choke rings 43. As a result, one or more pressure signals are created in the drilling stream, the number of signals depending upon the range of downward movement of the plunger, which range of downward movement, in turn, depends on the action of the pendulum 56 in limiting the preceding upward movement of the plunger. These signals may be sensed at the top of the well or may be detected by suitable pressure-responsive means.

It is apparent that the skirt 30 at all times protects the protruding portion of the plunger 27 as well as the guide bushing 26 from the abrasive effect of direct impact by the downwardly flowing drilling fluid. In the absence of such protection, an extensive portion of the plunger would be exposed to severe abrasion and the guide bushing would be exposed to permit the impingement of high velocity particles against its upper surface with consequent jamming of abrasive particles between the elastomer member 47 and the plunger. The skirt 30 acts as a highly effective damper against vibration of the plunger head when the plunger head is extended and would otherwise be free to vibrate like a reed. The damping action is attributable in part to the mass of the skirt and its downwardly extending position relative to its point of attachment to the plunger. Apparently, however, the damping effectiveness of the skirt is attributable primarily to hydrodynamic factors. In this regard, it is important to note that a column of the drilling fluid is confined inside the skirt at all times.

It is to be further noted that the skirt provides a certain dashpot action as may be understood by referring to Fig. 1. The rate at which the plunger retracts from the position shown in Fig. 1 can be no greater than the rate at which the drilling fluid is expelled from the interior of the skirt through the annular clearance space between the skirt and the instrument case. As soon as the skirt passes the ports 29 in the instrument case, this annular clearance space must accommodate not only the drilling fluid expelled from the region of the protruding portion of the plunger but also the drilling fluid expelled from the interior of the instrument case through the ports 29. It is also to be noted that the annular clearance space between the instrument case and the skirt through which the expelled drilling fluid must flow increases in length as the plunger drops and herefore the resistance to release of the drilling fluid increases.

While the preferred embodiment of the invention depends primarily on retardation by the dashpot piston 53, it will be readily apparent to those skilled in the art that the same retarding effect can be approximated by the dashpot action of the skirt 30 and that the skirt 30 may be of a length to enclose the instrument ports 29 at all times so that the skirt also serves at all times to restrict the rate of flow of drilling fluid into and out of the instrument.

My disclosure in specific detail of a presently preferred practice of the invention will suggest to those skilled in the art various changes, substitutions and other departures from my disclosure that properly lie within the spirit and scope of the appended claims.

I claim as my invention:

1. In a signalling drift indicator for service in a stream of drilling fluid in a well bore, the indicator having a housing for positioning in the well bore coaxially thereof, a plunger extending from one end of said housing for retraction by the fluid stream, said plunger having a substantial extended length and the ratio of the extended length of said plunger to the diameter thereof being such that said plunger tends to vibrate like a reed in response to fluid flow therepast when extended, yielding means to extend the plunger when said fluid stream is not effective, means to limit movement of the plunger in accord with the inclination of the housing from vertical, and signal means responsive to movement of said plunger to indicate the magnitude of such movement, the combination therewith of: a skirt mounted on said plunger and extending toward said housing to telescope over said housing, said skirt having a length substantially equal to the extended length of said plunger so as to damp the extended plunger against vibration and to protect the plunger against abrasive high velocity impact by said stream.

2. The combination as set forth in claim 1 in which said skirt is of a length to enclose said one end of said housing when said plunger is at its position of maximum extension.

3. The combination as set forth in claim 1 in which said skirt is dimensioned to cooperate with said housing to provide restricted clearance for flow of the drilling fluid into and out of the space inside the skirt thereby providing a dashpot action to retard movement of the plunger.

4. A combination as set forth in claim 1 in which said skirt telescopes over said housing with relatively small clearance to cooperate with the housing to block the movement of relatively large particles into the space defined by the skirt.

5. A combination as set forth in claim 1 in which said housing has at least one port for ingress and egress of said fluid, said port being positioned within the range of reciprocation of said skirt.

6. A combination as set forth in claim 5 in which said one end of said housing has a guide bushing embracing said plunger.

7. A combination as set forth in claim 6 in which said port is on the periphery of said housing below said guide bushing.

8. In a signalling drift indicator for service in a downwardly flowing drilling fluid stream in a well bore, said indicator having a housing for positioning in the well bore coaxially thereof, a plunger extending longitudinally from said housing for retraction in response to impact by the fluid stream, yielding means to extend the plunger when said drilling stream is not effective, means to limit the extension of the plunger in accord with the inclination of the housing from vertical, signal means responsive to movement of said plunger in one direction to indicate the magnitude of the plunger movement, and a body of instrument fluid in said housing surrounding the inner end of said plunger, the combination therewith of: an annular floating piston slidingly embracing said plunger in sliding contact with the surrounding housing to confine said instrument fluid in said housing and to move in directions opposite to the movement of said plunger to follow changes in the level of said body of fluid caused by variations in displacement of the fluid by the plunger, said floating piston being a body of resilient material having annular sealing lips at its upper and lower ends for contact with said plunger and having annular sealing lips at its upper and lower ends for contact with the inner wall of said housing.

9. In a signalling drift indicator for service in a downwardly flowing drilling fluid stream in a well bore, said indicator having a housing for positioning in the well bore coaxially thereof, a plunger extending longitudinally from said housing for retraction in response to impact by the fluid stream, yielding means to extend the plunger when said drilling stream is not effective, means to limit the extension of the plunger in accord with the inclination of the housing from vertical, signal means responsive to movement of said plunger in one direction to indicate the magnitude of the plunger movement, and a body of instrument fluid in said housing surrounding the inner end of said plunger, the combination therewith of: an annular floating piston slidingly embracing said plunger in sliding contact with the surrounding housing to confine said instrument fluid in said housing and to move in directions opposite to the movement of said plunger to follow changes in the level of said body of fluid caused by variations in displacement of the fluid by the plunger; and scraper means positioned adjacent to said floating piston for movement with said floating piston to scrape particles from said plunger and the inner wall of said housing.

10. A combination as set forth in claim 9 which includes a coil spring in the housing to press said scraper means against said floating piston and thereby press said piston against said body of fluid to prevent the formation of voids in the fluid.

11. In a signalling drift indicator for service in a downwardly flowing drilling fluid stream in a well bore, said indicator having a housing for positioning in the well bore coaxially thereof, a plunger extending longitudinally from said housing for retraction in response to impact by the fluid stream, yielding means to extend the plunger when said drilling stream is not effective, means to limit the extension of the plunger in accord with the inclination of the housing from vertical, signal means responsive to movement of said plunger in one direction to indicate the magnitude of the plunger movement, and a body of instrument fluid in said housing surrounding the inner end of said plunger, the combination therewith of: an annular floating piston slidingly embracing said plunger in sliding contact with the surrounding housing to confine said instrument fluid in said housing and to move in directions opposite to the movement of said plunger to follow changes in the level of said body of fluid caused by variations in displacement of the fluid by the plunger; and a dashpot piston carried by said plunger and submerged in said body of fluid, said housing being equipped with a fixed stop to abut said dashpot piston, said fixed stop being placed between said dashpot piston and said floating piston.

References Cited in the file of this patent

UNITED STATES PATENTS

| | | |
|---|---|---|
| 1,911,997 | Gillespie | May 30, 1933 |
| 2,046,956 | Lynch et al. | July 7, 1936 |
| 2,329,732 | Varney et al. | Sept. 21, 1943 |
| 2,435,934 | Varney et al. | Feb. 10, 1948 |
| 2,482,224 | Swearingen | Sept. 20, 1949 |